United States Patent
Crane et al.

(10) Patent No.: US 7,856,292 B2
(45) Date of Patent: Dec. 21, 2010

(54) SYSTEM AND METHOD FOR LOWERING A TEMPERATURE OF LIQUID EXITING A HEAT EXCHANGER IN A VAPOR COMPRESSION SYSTEM

(75) Inventors: Curtis Christian Crane, York, PA (US); Brian T. Gallus, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 333 days.

(21) Appl. No.: 12/175,123

(22) Filed: Jul. 17, 2008

(65) Prior Publication Data
US 2009/0024257 A1  Jan. 22, 2009

Related U.S. Application Data

(63) Continuation-in-part of application No. PCT/US2008/070178, filed on Jul. 16, 2008.

(60) Provisional application No. 60/950,205, filed on Jul. 17, 2007.

(51) Int. Cl.
*G05D 23/00* (2006.01)
*F25B 1/00* (2006.01)

(52) U.S. Cl. .......................... 700/300; 700/302; 62/498

(58) Field of Classification Search ............... 700/276, 700/278, 300, 302; 62/498
See application file for complete search history.

(56) References Cited

U.S. PATENT DOCUMENTS

| | | | | |
|---|---|---|---|---|
| 4,608,833 | A * | 9/1986 | Kountz | 62/228.1 |
| 4,686,834 | A * | 8/1987 | Haley et al. | 62/209 |
| 5,537,830 | A * | 7/1996 | Goshaw et al. | 62/201 |
| 5,845,509 | A | 12/1998 | Shaw et al. | |
| 6,434,960 | B1 | 8/2002 | Rousseau | |
| 6,688,124 | B1 | 2/2004 | Stark et al. | |

FOREIGN PATENT DOCUMENTS

| | | |
|---|---|---|
| GB | 2059642 A | 4/1981 |
| WO | 03089118 A2 | 10/2003 |

\* cited by examiner

*Primary Examiner*—Ryan A Jarrett
(74) *Attorney, Agent, or Firm*—McNees Wallace & Nurick LLC

(57) ABSTRACT

A pull-down control process for a chiller system is provided. The pull-down control process can override the capacity control process for the chiller system to pull-down the leaving chilled liquid temperature faster than the capacity control process. The pull-down control process can maintain pre-rotation vanes in a fully open position to pull-down the leaving chilled liquid temperature as quickly as possible to a predetermined setpoint.

20 Claims, 4 Drawing Sheets

SYSTEM AND METHOD FOR LOWERING A TEMPERATURE OF LIQUID EXITING A HEAT EXCHANGER IN A VAPOR COMPRESSION SYSTEM

CROSS-REFERENCE TO RELATED APPLICATIONS

This application claims priority from and the benefit of U.S. Provisional Application No. 60/950,205, entitled PULL-DOWN CONTROL FOR CHILLER SYSTEMS, filed Jul. 17, 2007, which is hereby incorporated by reference and this application is a continuation-in-part of PCT Patent Application No. PCT/US08/70178, entitled CONTROL SYSTEM, filed Jul. 16, 2008, which is hereby incorporated by reference.

BACKGROUND

The application generally relates to control systems for chilled liquid systems. The application relates more specifically to a control process to pull the leaving chilled liquid temperature of a chilled liquid system down to a predetermined set point.

In a chilled liquid system, a chilled liquid, for example, water, is circulated through a building to remove heat from the building. The liquid in the chilled liquid system is cooled in an evaporator (or chiller) using a heat exchanger, wherein the liquid is cooled by a refrigerant that accepts heat from the liquid. Chilled liquid systems are often operated at temperatures (operating setpoints) within a few degrees of the freezing point of the liquid. In conventional chilled liquid systems, a control system is often programmed to shut down the chilled liquid system as soon as the evaporator liquid temperature decreases to a certain temperature (a cutout point) near or below the freezing point of the liquid to avoid freezing the tubes and damaging the evaporator. For example, a chilled liquid system using water may have an operating setpoint of 35 degrees F. and a cutout point of 34 degrees F.

A difference of only one degree between the operating setpoint and the cutout point in the chilled liquid system generally does not cause problems during normal or steady-state operation of the chilled liquid system. However, when the chilled liquid system is required during a pull-down operation to reduce the liquid temperature from an ambient temperature to the operating setpoint, a one degree difference between the operating setpoint and the cutout point can be problematic. The chilled liquid system may be shut down by the control system during a pull-down operation, if the liquid temperature in the evaporator overshoots the operating setpoint and reaches the cutout point. To avoid this problem, conventional control systems are programmed to minimize overshoot during pull-down operations at the expense of pull-down response time.

For example, in conventional chilled liquid systems using centrifugal compressors, when doing a "hot liquid" pull-down, that is, a pull-down where the liquid temperature is at or above the ambient temperature, the chilled liquid system is often operating at the current limit for the motor(s) of the compressor(s) of the chilled liquid system to pull or lower the leaving chilled liquid temperature (LCHLT) down to the operating setpoint. As the LCHLT asymptotically approaches the operating setpoint, the capacity controller for the chilled liquid system can unload the system by closing pre-rotation vanes to the compressor to minimize overshoot of the operating setpoint. When not operating at the current limit for the motor(s), the closing of the pre-rotation vanes would be the appropriate action since the chilled liquid system could work harder, for example, by increasing motor speed, if necessary, to pull the LCHLT down faster. However, when operating at the current limit for the motor(s), the chilled liquid system physically cannot work any harder to pull the LCHLT down. Since the chilled liquid system cannot work any harder, the LCHLT cannot be pulled down any faster and the rate of pull-down is slowed. When the capacity controller closes the pre-rotation vanes while the motor(s) are at or close to their corresponding current limits, the closing of the pre-rotation vanes can cause the pull-down time to be increased.

SUMMARY

The present invention relates to a method of lowering a temperature of a liquid exiting a heat exchanger in a vapor compression system. The method measures a temperature of a liquid leaving a heat exchanger in a vapor compression system and compares the measured temperature to a predetermined temperature. Next, the method measures a position of a flow control device configured to regulate flow of refrigerant to a compressor in the vapor compression system in response to the measured temperature being greater than the predetermined temperature and compares the measured position to a predetermined position. The method also measures a current for a motor of the compressor in response to the measured position being in the predetermined position and compares the measured current to a predetermined current. Finally, the method maintains the flow control device in the predetermined position in response to the measured supply current being greater than the predetermined current. The maintaining of the flow control device in the predetermined position enables a rate of change of the measured temperature to remain substantially constant.

The present invention further relates to a system having a compressor, first heat exchanger, expansion device and second heat exchanger connected in a closed loop and a motor configured and disposed to drive the compressor. The second heat exchanger includes a return connection to receive a liquid from a cooling load and a supply connection to provide the liquid to the cooling load. The system also has a flow control device associated with the compressor to regulate flow of a fluid into the compressor and a control panel configured to provide output signals to the flow control device to maintain the flow control device in a predetermined position in response to a measured temperature of the liquid to be provided to the cooling load being greater than a predetermined temperature, a measured position of the flow control device being in a predetermined position and a measured current of the motor being greater than a predetermined current. The maintaining of the flow control device in the predetermined position enables a rate of change of the measured temperature of the liquid to be provided to the cooling load to remain substantially constant.

DETAILED DESCRIPTION OF THE EXEMPLARY EMBODIMENTS

Figure 1:
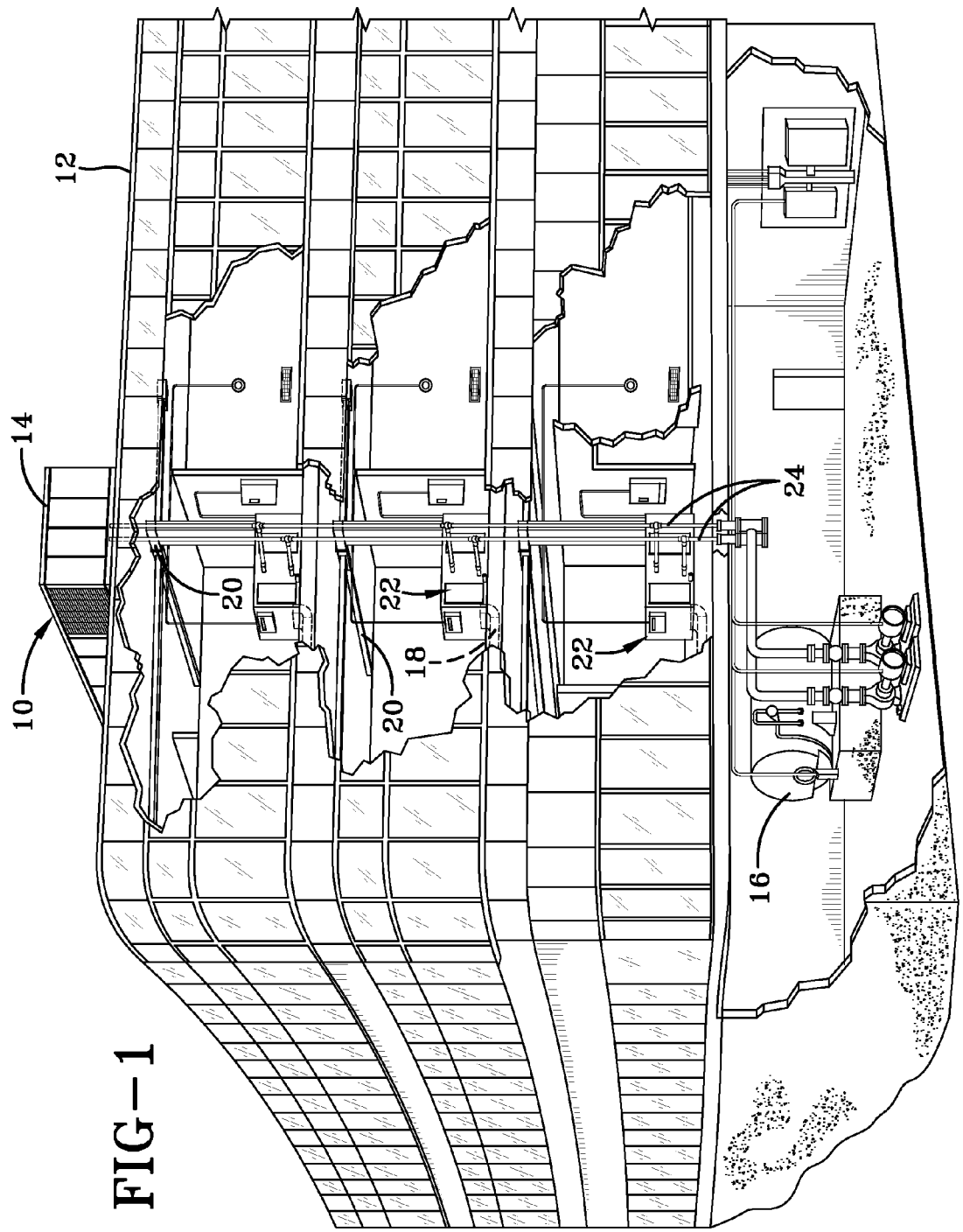
FIG. 1 shows an exemplary environment for a chilled liquid system.

FIG. 1 shows an exemplary environment for a chilled liquid system 10 in a building 12 for a typical commercial setting. System 10 can include a vapor compression system incorporated into a rooftop unit 14 that can supply a chilled liquid that may be used to cool building 12. System 10 can also include a boiler 16 to supply a heated liquid that may be used to heat building 12, and an air distribution system that circulates air through building 12. The air distribution system can include an air return duct 18, an air supply duct 20 and an air handler 22. Air handler 22 can include a heat exchanger that is connected to boiler 16 and rooftop unit 14 by conduits 24. The heat exchanger in air handler 22 may receive either heated liquid from boiler 16 or chilled liquid from rooftop unit 14 depending on the mode of operation of system 10. System 10 is shown with a separate air handler on each floor of building 12, but it will be appreciated that the components may be shared between or among floors.

Figure 2:
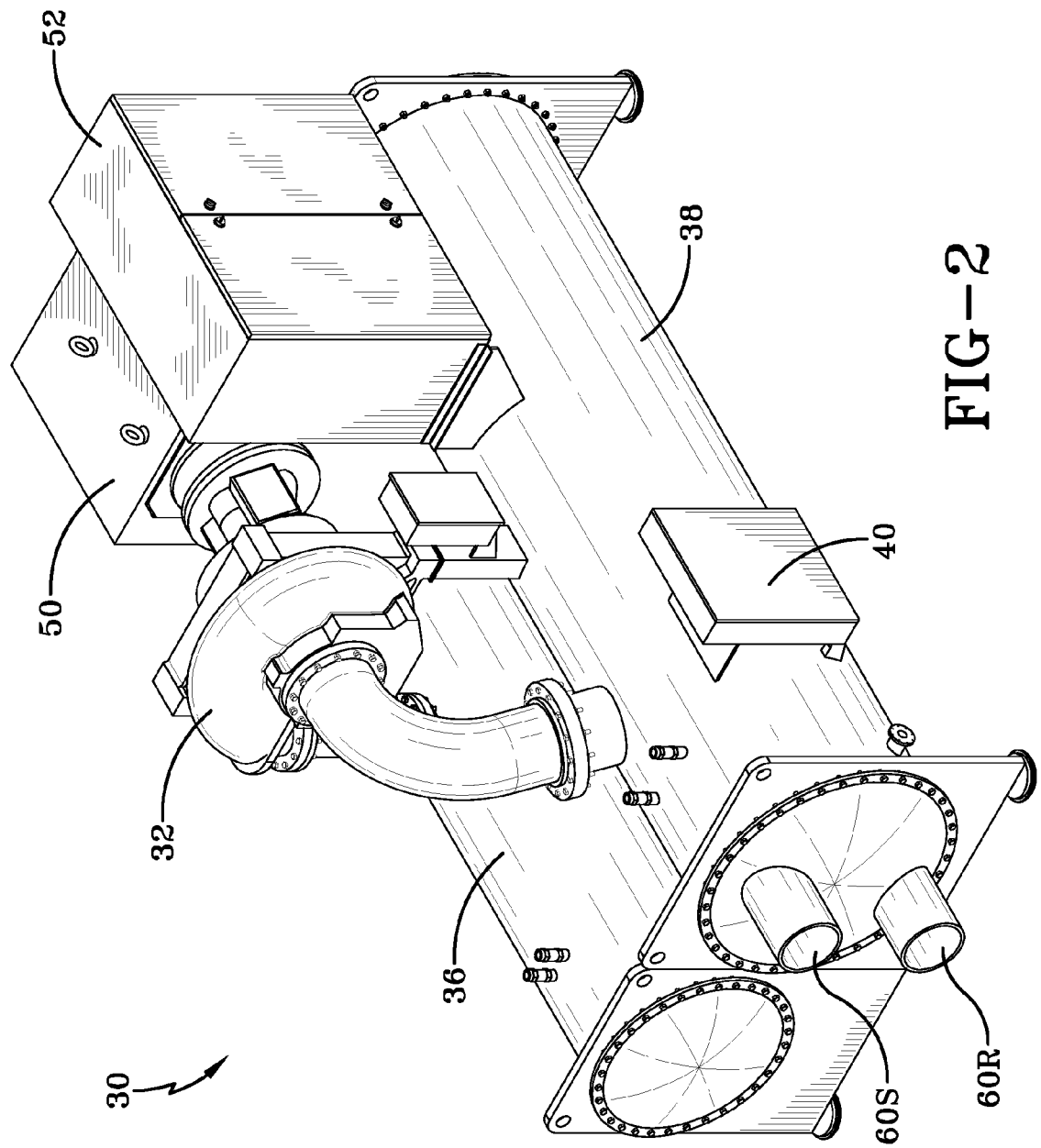
FIG. 2 shows an isometric view of an exemplary vapor compression system that is part of a chilled liquid system.
Figure 3:
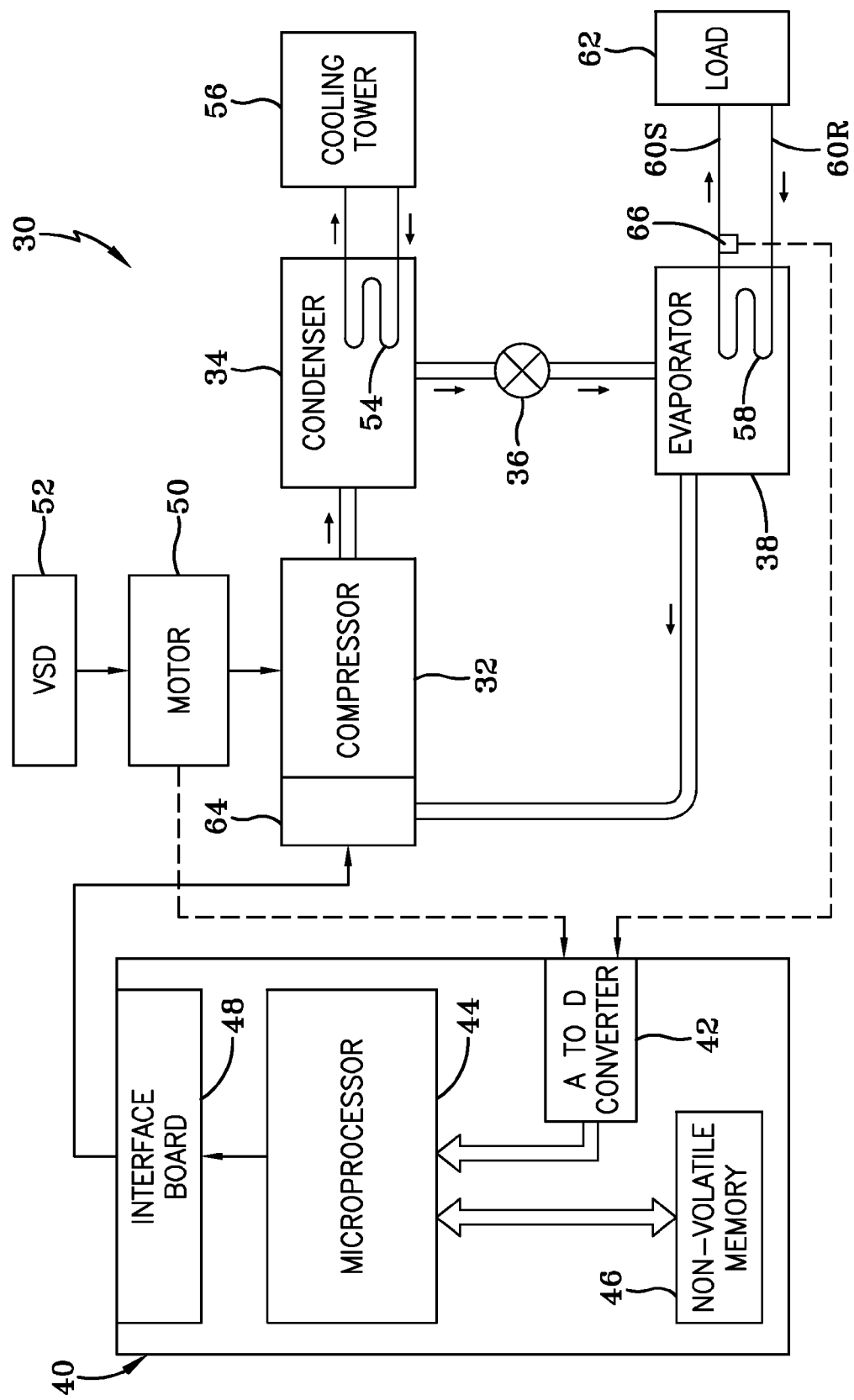
FIG. 3 schematically shows an exemplary embodiment of a vapor compression system.

FIGS. 2 and 3 show an exemplary vapor compression system 30 that can be used in chilled liquid system 10. Vapor compression system 30 can circulate a refrigerant through a compressor 32 driven by a motor 50, a condenser 34, expansion device(s) 36, and a liquid chiller or evaporator 38. Vapor compression system 30 can also include a control panel 40 that can include an analog to digital (A/D) converter 42, a microprocessor 44, a non-volatile memory 46, and an interface board 48. Some examples of fluids that may be used as refrigerants in vapor compression system 30 are hydrofluorocarbon (HFC) based refrigerants, for example, R-410A, R-407, R-134a, or any other suitable type of refrigerant.

Motor 50 used with compressor 32 can be powered by a variable speed drive (VSD) 52 or can be powered directly from an alternating current (AC) or direct current (DC) power source. VSD 52, if used, receives AC power having a particular fixed line voltage and fixed line frequency from the AC power source and provides power having a variable voltage and frequency to motor 50. Motor 50 can be any type of electric motor that can be powered by a VSD 52 or directly from an AC or DC power source. For example, motor 50 can be a switched reluctance motor, an induction motor, an electronically commutated permanent magnet motor or any other suitable motor type. In an alternate exemplary embodiment, other drive mechanisms such as steam or gas turbines or engines and associated components can be used to drive compressor 32.

Compressor 32 compresses a refrigerant vapor and delivers the vapor to condenser 34 through a discharge line. Compressor 32 can be a centrifugal compressor, screw compressor, reciprocating compressor, rotary compressor, swing link compressor, scroll compressor, turbine compressor, or any other suitable compressor. The refrigerant vapor delivered by compressor 32 to condenser 34 transfers heat to a fluid, e.g., water or air. The refrigerant vapor condenses to a refrigerant liquid in condenser 34 as a result of the heat transfer with the fluid. The liquid refrigerant from condenser 34 flows through expansion device 36 to evaporator 38. In the exemplary embodiment shown in FIG. 3, condenser 34 includes a tube bundle 54 connected to a cooling tower 56.

The liquid refrigerant delivered to evaporator 38 absorbs heat from another fluid, which may or may not be the same type of fluid used for condenser 34, and undergoes a phase change to a refrigerant vapor. In the exemplary embodiment shown in FIG. 3, evaporator 38 includes a tube bundle 58 having a supply line 60S and a return line 60R connected to a cooling load 62. A liquid, for example, water, ethylene glycol, calcium chloride brine, sodium chloride brine, or any other suitable liquid, enters evaporator 38 via return line 60R and exits evaporator 38 via supply line 60S. Evaporator 38 chills the temperature of the liquid in the tubes. Tube bundle 58 can include a plurality of tubes. The vapor refrigerant exits evaporator 38 and returns to compressor 32 by a suction line to complete the cycle.

At the input to compressor 32 from evaporator 38, there are one or more flow control devices 64 that control the flow of refrigerant to compressor 32. An actuator can be used to open flow control device 64 to increase the amount of refrigerant to compressor 32 and thereby increase the capacity of system 30. Similarly, the actuator can be used to close flow control device 64 to decrease the amount of refrigerant to compressor 32 and thereby decrease the capacity of system 30. In an exemplary embodiment, flow control devices 64 can be pre-rotation vanes or inlet guide vanes used with a centrifugal compressor. It is to be understood that the type of flow control device used to regulate flow of refrigerant into the compressor can be dependent on the type of compressor used in the system.

System 30 can include a sensor 66 for sensing the temperature that corresponds to the leaving chilled liquid temperature (LCHLT) from evaporator 38. Sensor 66 can be located in the chilled liquid flow, at the outlet pipe or supply line 60S from the evaporator shell. However, sensor 66 can be placed in any location that provides an accurate measurement of the LCHLT. Sensor 66 can be a temperature thermistor or any other suitable temperature sensor.

In an exemplary embodiment, sensor 66 is a temperature thermistor that outputs a resistance that is proportional to the measured temperature. The resistance from the thermistor can then be converted to a voltage signal, using a resistor divider connected to a voltage source or any other suitable technique for generating a voltage. The voltage signal from sensor 66 can then be transferred to control panel 40. The voltage signal input to control panel 40 can be converted to a digital signal or word by A/D converter 42.

Figure 4:
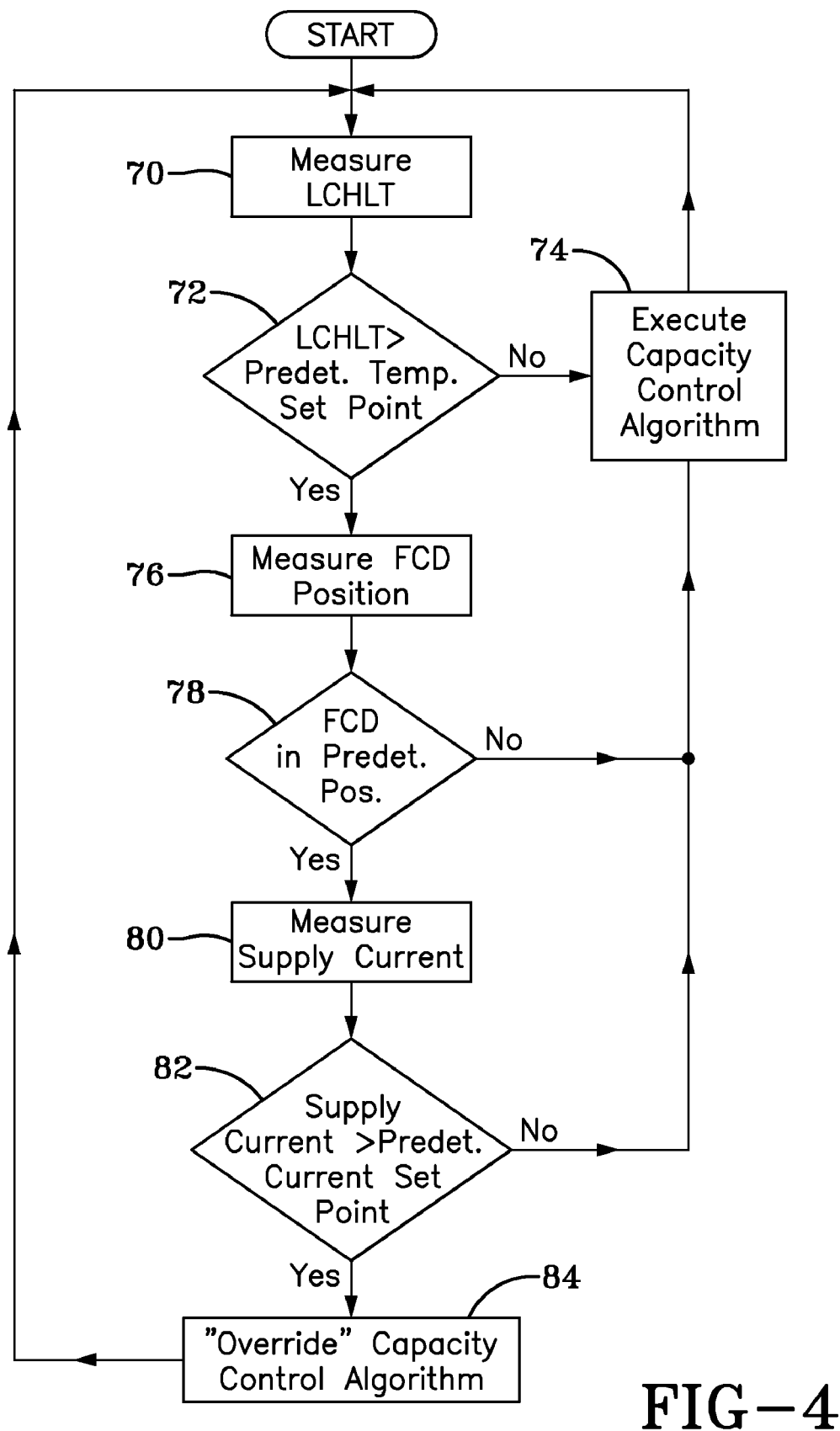
FIG. 4 shows an exemplary control process for pulling down the leaving chilled liquid temperature of a chilled liquid system.

FIG. 4 illustrates an exemplary embodiment of a pull-down control process that can be used when the LCHLT is greater than a predetermined temperature. The pull-down control process can be initiated in response to a starting command for the vapor compression system or in response to an instruction from a capacity control process or other control program for the chilled liquid system. The pull-down control process can be a stand-alone process or program or it can be incorporated into a larger control process or program, such as the capacity control process for the chilled liquid system.

The pull-down control process begins by measuring the LCHLT (step 70) and then comparing the measured LCHLT to a predetermined setpoint temperature (step 72). The predetermined setpoint temperature can be the operating setpoint for the chilled liquid system or derived from the operating setpoint, that is, the operating setpoint plus or minus an offset amount. If the LCHLT is not greater than the predetermined setpoint temperature, then the pull-down control process executes the capacity control process for the system (step 74).

If the LCHLT is greater than the predetermined setpoint temperature, then the pull-down control process measures or determines the position of the flow control device (FCD) (step 76), for example, pre-rotation vanes used with a centrifugal compressor, to determine if the flow control device is in a predetermined position (step 78), for example, a substantially fully open position. In other exemplary embodiments, the predetermined position can be related to other positions of the flow control device besides a fully open position and the corresponding comparison logic can be changed to logic such as if the position of the flow control device is equal to or greater than, that is, more open than, the predetermined position. If the flow control device is not in the predetermined position, then the pull-down control process executes the capacity control process (step 74) for the chilled liquid system. If the flow control device is in the predetermined position, the pull-down control process measures a supply current for the motor of the compressor (step 80), for example, a motor current or output current from the variable speed drive, to determine if the supply current is greater than a predetermined setpoint current (step 82). The predetermined setpoint current can be based on a full load amperage rating (FLA) for the motor and can be between about 90% FLA and about 100% FLA. In an exemplary embodiment, the predetermined setpoint current can be about 95% FLA. If the supply current is not greater than the predetermined setpoint current, then the pull-down control process executes the capacity control process (step 74) for the chilled liquid system. However, if the supply current is greater than the predetermined setpoint current, then the pull-down control process "overrides" the capacity control process (step 84) and continues to maintain vapor compression system operation to maintain about the same pull-down rate. When the pull-down control process "overrides" the capacity control process, the flow control device is maintained or held in the fully open position to enable the pull-down rate to remain substantially constant and avoid a decrease in the pull-down rate from the closing of the flow control device, which closing of the flow control device would most likely occur if the capacity control process was not "overridden." In an exemplary embodiment, the frequency of the variable speed drive can still be varied while the flow control device is held in the open position in order to provide some capacity control to the system to avoid overshooting the LCHLT operating setpoint.

In an exemplary embodiment, the capacity control process can generate control signals for the flow control device and/or the variable speed drive based on the LCHLT and other measured system parameters. The control signals for the flow control device and the variable speed drive can be provided to the interface board 48 of the control panel 40. The interface board 48 then provides the control signal to the flow control device 64 to position the flow control device 64 and/or provides the control signal to the variable speed drive 52 to control the output frequency and/or voltage of the variable speed drive 52. In an exemplary embodiment, the capacity control process can be a computer program having a series of instructions executable by microprocessor 44. In an exemplary embodiment, the capacity control process determines whether to cause the flow control device to further open, further close or maintain the same position, thereby regulating the flow of refrigerant vapor and correspondingly the LCHLT. Similarly, the capacity control process can determine whether to increase the frequency of the variable speed drive, decrease the frequency of the variable speed drive or maintain the same frequency in the variable speed drive.

Embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

While only certain features and embodiments of the invention have been shown and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A method of lowering a temperature of a liquid exiting a heat exchanger in a vapor compression system, the method comprising:

measuring a temperature of a liquid leaving a heat exchanger in a vapor compression system;

comparing the measured temperature to a predetermined temperature;

measuring a position of a flow control device configured to regulate flow of refrigerant to a compressor in the vapor compression system in response to the measured temperature being greater than the predetermined temperature;

comparing the measured position to a predetermined position;

measuring a current for a motor of the compressor in response to the measured position being in the predetermined position;

comparing the measured current to a predetermined current; and maintaining the flow control device in the predetermined position in response to the measured supply current being greater than the predetermined current, wherein the maintaining of the flow control device in the predetermined position enables a rate of change of the measured temperature to remain substantially constant.

2. The method of claim 1 further comprising executing a capacity control algorithm for the vapor compression system in response to the measured temperature being less than the predetermined temperature.

3. The method of claim 1 further comprising executing a capacity control algorithm for the vapor compression system in response to the measured position being different from the predetermined position.

4. The method of claim 1 further comprising executing a capacity control algorithm for the vapor compression system in response to the measured supply current being less from the predetermined current.

5. The method of claim 1 further comprising varying an output power provided to the motor by a variable speed drive in response to the flow control being maintained in the predetermined position.

6. The method of claim 1 wherein the predetermined temperature is derived from an operating setpoint temperature of the liquid leaving a heat exchanger in a vapor compression system.

7. The method of claim 1 wherein the compressor comprises a centrifugal compressor and the flow control device comprises pre-rotation vanes.

8. The method of claim 1 wherein the measuring a current for a motor comprises measuring an output current of a variable speed drive powering the motor.

9. The method of claim 1 wherein the predetermined position is a substantially fully open position of the flow control device.

10. The method of claim 1 wherein the predetermined current is between about 90 percent of the full load amperage rating of the motor and 100 percent of the full load amperage rating of the motor.

11. A system comprising:
a compressor, first heat exchanger, expansion device and second heat exchanger connected in a closed loop;
a motor configured and disposed to drive the compressor;
the second heat exchanger comprising a return connection to receive a liquid from a cooling load and a supply connection to provide the liquid to the cooling load;
a flow control device associated with the compressor and configured to regulate flow of a fluid into the compressor; and
a control panel configured to provide output signals to the flow control device to maintain the flow control device in a predetermined position in response to a measured temperature of the liquid to be provided to the cooling load being greater than a predetermined temperature, a measured position of the flow control device being in a predetermined position and a measured current of the motor being greater than a predetermined current, wherein the maintaining of the flow control device in the predetermined position enables a rate of change of the measured temperature of the liquid to be provided to the cooling load to remain substantially constant.

12. The system of claim 11 further comprising a variable speed drive configured and disposed to provide power to the motor.

13. The system of claim 12 wherein the control panel is configured to provide output signals to the variable speed drive to regulate the power provided to the motor by the variable speed drive.

14. The system of claim 12 wherein the measured current of the motor is an output current of the variable speed drive.

15. The system of claim 11 wherein the predetermined position is a substantially fully open position of the flow control device.

16. The system of claim 11 wherein the predetermined current is between about 90 percent of the full load amperage rating of the motor and 100 percent of the full load amperage rating of the motor.

17. The system of claim 11 further comprising a sensor configured and disposed to measure a parameter corresponding to the temperature of the liquid provided to the cooling load.

18. The system of claim 17 wherein the sensor comprises a temperature thermistor.

19. The system of claim 11 wherein the compressor comprises a centrifugal compressor and the flow control device comprises pre-rotation vanes.

20. The system of claim 11 wherein the control panel comprises one or more of an analog to digital converter, a memory device or an interface board.

* * * * *